United States Patent [19]
Pritchett, Jr. et al.

[11] Patent Number: 6,086,775
[45] Date of Patent: Jul. 11, 2000

[54] PREPARATION OF COLORED OPTICAL FIBER FOR SPLICING

[75] Inventors: Louis Ray Pritchett, Jr., Lithonia; Shahabuddin Siddiqui, Lawrenceville; John Russell Szwec, Woodstock, all of Ga.

[73] Assignee: Lucent Technologies Inc., Murray Hill, N.J.

[21] Appl. No.: 09/041,608

[22] Filed: Mar. 13, 1998

[51] Int. Cl.⁷ .................................................. C03C 25/06
[52] U.S. Cl. ................................ 216/24; 216/95; 216/97; 216/99
[58] Field of Search ................................ 216/97, 99, 95, 216/24

[56] References Cited

U.S. PATENT DOCUMENTS

| | | | |
|---|---|---|---|
| 4,035,210 | 7/1977 | Ohyoshi et al. | 156/645 |
| 4,469,544 | 9/1984 | Goodman | 156/345 |
| 4,832,722 | 5/1989 | Henderson | 65/3.12 |
| 5,342,426 | 8/1994 | Dumbaugh, Jr. | 65/23 |

*Primary Examiner*—Karl Group

[57] ABSTRACT

A method for preparing coated optical fibers wherein an outer coating is a colored ink coating, and an inner coating is a protective coating, which removes the ink coating while minimizing damage to the protective coating. The method includes uimersing the fiber in a dilute acid bath at a predetermined length of time, removing the fiber from the bath and neutralizing the acid thereon, wiping the remnant ink coating off, and removing the protective coating.

11 Claims, 2 Drawing Sheets

| FIBER SET | PROOFTEST STRENGTH (kpsi) | RED | BLUE | YELLOW | BROWN | ORANGE | VIOLET | BLACK | GREEN |
|---|---|---|---|---|---|---|---|---|---|
| 1 | PROOFTEST STRENGTH (kpsi) | 229 | 358 | 214 | 322 | 286 | 234 | 179 | 202 |
| 2 | PROOFTEST STRENGTH (kpsi) | 319 | 252 | 258 | 200 | 149 | 234 | 361 | 271 |
| 3 | PROOFTEST STRENGTH (kpsi) | 157 | 266 | 292 | 382 | 196 | 179 | 344 | 36 |
| 4 | PROOFTEST STRENGTH (kpsi) | 213 | 217 | 290 | 273 | 202 | 188 | 225 | 296 |
| 5 | PROOFTEST STRENGTH (kpsi) | 368 | 209 | 371 | 222 | 324 | 205 | 251 | 266 |

FIG. 3

PREPARATION OF COLORED OPTICAL FIBER FOR SPLICING

FIELD OF THE INVENTION

This invention relates to optical fiber splicing, and more particularly, to the preparation of colored optical fibers for splicing.

BACKGROUND OF THE INVENTION

Optical fiber cables are manufactured containing a large number of individual fibers, either in the form of ribbons containing, for example, twelve fibers in a parallel array, with several ribbons then being stacked together within the cable jacket, or in the form of loose fibers bundled within the fiber jacket along with one or more strength members. It is the practice in either case, as well as in other cable configurations, to color code the fibers for identification purposes. Thus, in the manufacture of the individual fibers, each fiber is given a protective coating of an ultraviolet (UV) curable aciylate, over which is applied a UV curable ink coating generally of approximately 6 to 9 microns thick of the desired color. It is also generally the practice that the various colored inks contain titanium dioxide ($TiO_2$), which enhances and brightens the color for enabling the different colors to be more quickly and efficiently distinguishable.

The individual fibers are drawn and wound upon reels containing, for example, several kilometers of the fiber having a specific color. For greater continuous lengths of fiber, it is necessary to splice the trailing end of a first colored fiber to the leading end of a second fiber of the same color. However, in order to achieve an optimum splice, it is necessary to prepare the mating ends of the two fibers by removing the ink coating and the protective coating so that such a splice may be effected. Removal of the coatings has, heretofore, been accomplished by insertion of the fiber end in a bath of concentrated sulfuric acid, at full strength, designated as 36N, at approximately one hundred and ninety degrees (190° C.), plus or minus five degrees (±5° C.). Where the fiber has no colored ink coating, this process makes possible high strength (>200–235 kpsi, where kpsi is kilopounds per square inch) splices. On the other hand, this process does not produce fiber ends of sufficient lack of contamination by the coatings to achieve the required splice strength, especially where the ink coating is a UV curable ink containing titanium dioxide. It is believed that this results from the fact that the titanium dioxide does not completely dissolve in the sulfuric acid and, as a consequence, contaminates the bath. Thus, when the fiber is placed in the bath and its coatings are dissolved, the titanium dioxide in the bath redeposits on the bare glass fiber and damages it to the extent that its tensile strength is weakened, thereby weakening the subsequent splice. On terrestrial systems, weakened splices are easily detected and accessed. However, submarine cables, as can well be appreciated, present a far more formidable problem. Weak splices in a submarine cable are anathema, and, as a consequence, it is necessary to use expensive coloring inks which must be especially designed for the submarine cable use.

What is needed, and, apparently, has not heretofore been used, is a method or process for removing the coatings of an optical fiber, one of which is a UV curable colored ink containing an enhancing agent such as titanium dioxide, without contaminating or damaging the fiber from which the coatings are removed.

SUMMARY OF THE INVENTION

The present invention, in a preferred embodiment thereof, is a method or process for substantially completely removing the coatings from an optical fiber without damage to the fiber, thereby leaving it in condition for splicing wherein the splice itself surpasses a predetermined minimum strength.

The process of the invention comprises the steps of immersing the fiber end in a dilute (18N or 50% solution in water) sulfuric acid bath heated to a range of approximately one hundred eighteen to one hundred twenty-five degrees centigrade (118° C.–125° C.) plus or minus two degrees (±2° C.) for approximately forty-three to forth-seven seconds plus or minus two seconds (45±2 sec.). As will be discussed hereinafter, some fibers may have an exterior coating over the ink which should be removed prior to introducing the fiber into the acid bath. The dilute acid bath has the affect of removing the ink coating first, and, when the temperature and time are observed, the fiber, when removed from the bath, the ink coating has been substantially dissolved, while the fiber protection coating is substantially intact. The fiber is then inserted into a bath of an acid neutralizing agent such as methanol for approximately five seconds, for example. At this point, the fiber is wiped clean as with an alcohol pad to remove the remnants of the colored ink, leaving an uncolored, coated, fiber. The final step is removal of the colorless protective coating on the fiber as by, for example, another, separate, sulfuric acid bath.

The process of the invention produces uncoated and uncontaminated fibers for splicing, and the resulting splices uniformly exceed to minimum requirement of 235 kpsi.

The various principals and features of the present invention will be more readily understood from the following detailed description, read in conjunction with the accompanying drawings.

DESCRIPTION OF THE DRAWINGS

FIG. 3 is a table of experimental results demonstrating the efficacy of the present invention method.

DETAILED DESCRIPTION

Figure 1:
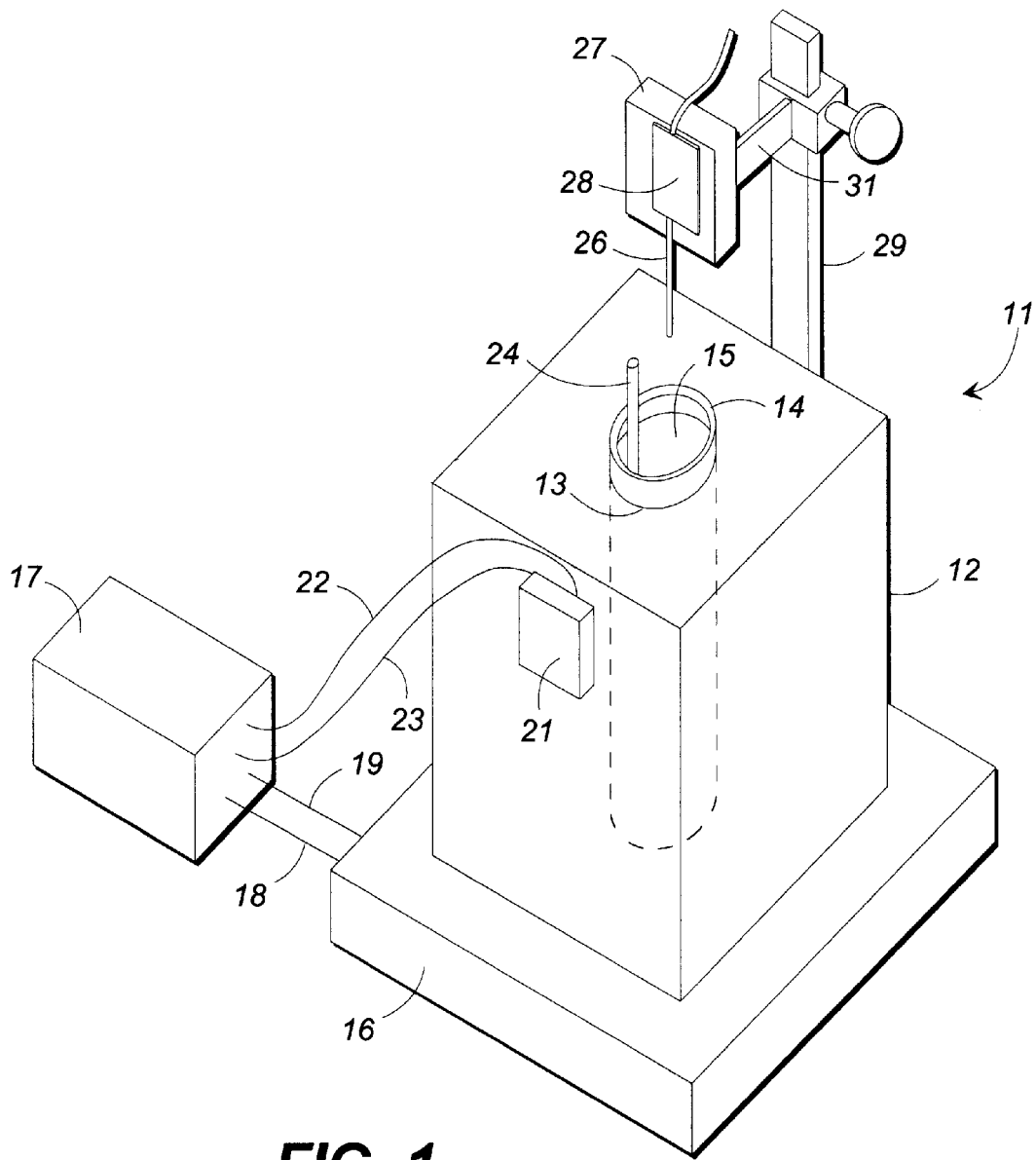
FIG. 1 is a perspective view of an apparatus arrangement for performing the method of the present invention.

FIG. 1 is a perspective view of an apparatus 11 for implementing the steps of the present invention. It is to be understood that the apparatus 11 is intended to be for illustrative purposes only and does not depict in any detail a specific apparatus. It will be obvious from the following description that many changes or alterations to the apparatus of FIG. 1 may be, and probably will be made. For example, it will be apparent that the method of the invention can be, for the most part, performed manually, automatically, or some where in between these two extremes.

Apparatus 11 comprises a metallic heating block 12 of suitable heat conductive material such, as for example, aluminum. Block 12 has a vertical bore 13 located therein which is adapted to contain a test tube 14 of suitable acid resistant material such as glass. Block 12 rests upon a heating element 16 which preferably receives heating current from a source 17 over leads 18 and 19. Attached or otherwise mounted to block 12 is a thermocouple heat sensing element 21 which signals, through leads 22 and 23, power source 17 to increase or decrease the heat to block 12. Heating element 16 is intended to represent any of a number of means for heating block 12, such as, for example, a reactance furnace or oven.

In preparation for the performance of the process, test tube 14 is filled with diluted sulfuric acid (18N) 15 to within approximately one inch from the top and is placed in bore 13. Heating unit 16, along with adjustable power source 17 is set so that the block 12 heats up and the temperature of the acid solution 15 is gradually raised to 120±2° C., where it is maintained. As a check on the temperature of acid solution 15, a thermometer 24 may be inserted into the solution to give instantaneous readings. When the solution 15 is at the desired temperature, block 12 will be at some temperature such as, for example, 170±5° C., and the thermocouple 21 may be set so as to maintain that block temperature, and hence the temperature of the acid solution.

As shown in FIG. 1, the coated fiber 26 to be heated is placed in a vertical groove of a metal holding block 27 and held vertically in place therein by a magnetic strip 28. Holding block 27 is shown mounted on a fixture 29 having a vertically adjustable arm 31 on the end of which block 27 is held. Preferably, arm 31 has a horizontal adjustment also so that fiber 26 may be centered over test tube 14, it being highly desirable that fiber 26 not touch the lip or walls of test tube 14. Fixture 29 may take any of a number of forms, and that shown in FIG. 1 is by way of example only.

As a pre-step in the method of the invention, the fiber 26 should be cleaned. This step applies particularly to what are known as unit fiber structure, in which several parallel spaced fibers are circumferentially arrayed about a carrier, such as, for example, a copper wire and held in place by a material such as Hytrel®. When an individual fiber is peeled from the structure, it may have a film of Hytrel® on it, which can readily be removed by suitable means such as a dry blue pad, prior to immersion in the acid 15.

Figure 2A:
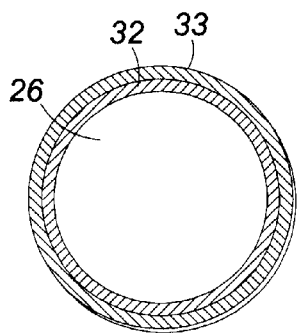
FIG. 2A is a cross-section view of an optical fiber prior to treatment by the method of the invention.
Figure 2B:
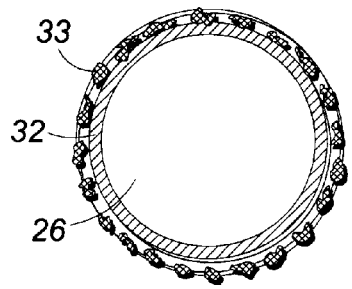
FIG. 2B is a cross-section of the fiber of FIG. 2A after treatment by the acid bath.

With the acid solution 15 at the desired temperature, the fiber 26 is lowered by fixture 29 into the solution and maintained there for 45±2 seconds. The affect of such immersion is shown in FIGS. 2A and 2B. FIG. 2A depicts a cross-section of fiber 26 with a protective coat 32 and an ink coat 33. FIG. 2B depicts the same cross-section after the approximately 45 second immersion where it can be seen that, although protective coat 32 is still intact, ink coat 33 has been dissolved, as represented by the several droplets.

After the 45±2 seconds in the sulfuric acid bath, the fiber 26 is removed therefrom and immersed immediately in a methanol bath at ambient temperature for approximately five seconds, to neutralize and rinse the acid off of the fiber. An alcohol pad or equivalent is then used to rub the fiber until the colored or ink layer 33 is completely removed. The treated fiber is then visually inspected under bright light for color specks, of which there should be none.

As a final step in preparing the fiber for splicing, the protective coating 32 is removed by usual or known means, such as immersion in another, different sulfuric acid bath at temperatures of, for example, 190±5° C.

If the fiber 26 remains in the first sulfiric acid bath for too long a period, the acid attacks the protective coating 32. Therefore it is important to have the dilution of the bath, the temperature thereof, and the time of immersion all calibrated in an arrangement such as shown in FIG. 1. When so calibrated, visual inspection is not necessary inasmuch as the conditions set forth hereinbefore apply to all colored fibers.

The process of the invention, therefore, includes the steps of heating the dilute sulfuric acid solution to approximately 120°±2°C.;

cleaning the end of the fiber to be prepared for splicing;

immersing the fiber end in the heated acid solution for approximately 45±2 seconds;

withdrawing the fiber from the solution;

immersing the fiber in a bath of methanol at room temperature for approximately five seconds;

withdrawing the fiber from the methanol bath;

wiping the residual ink layer from the fiber; and removing the protective layer from the fiber.

Depending upon the apparatus used, there are a number of ancillary steps to be performed also, such as, for example, cleaning the Hytrel® from the fiber, and mounting the fiber to a fixture and centering it over the acid bath.

FIG. 3 is a tabulation of several test runs for optimizing the parameters (temperature, time) of the method of the invention, with run number 5 (Fiber Set 5) depicting the results after optimization. It can be seen that all of the different colored ink coatings were removed to the extent that all of the fibers equaled or exceeded the minimum of 200 kspi, and thus insure proper splicing.

In concluding the detailed description, it should be noted that it will be obvious to those skilled in the art that many variations and modifications may be made to the preferred embodiment without departure from the principles of the present invention. All such variations and modifications are intended to be included herein as being within the scope of the present invention as set forth in the claims. Further, in the claims hereafter, the corresponding structures, materials, acts, and equivalents of all means or step plus function limitations are intended to include any structure, material, or acts for performing the functions with other claimed elements or steps as specifically claimed.

We claim:

1. A method for removing the coatings on an optical fiber end having a protective coating and a coating of colored material overlying the protective coating, said method comprising the steps of:

immersing the end of the optical fiber in a heated solution of diluted acid until the colored material overlying the protective coating dissolves;

removing the fiber from the diluted acid before the protective coating begins to dissolve;

neutralizing any remanent diluted acid on the fiber;

removing any remanent colored material coating; and removing the protective coating of the fiber from the fiber.

2. The method as claimed in claim 1 wherein the diluted acid solution is a 50% solution of sulfuric acid and water.

3. The method as claimed in claim 1 wherein the temperature of the diluted acid solution is in the range of 118–125° C.

4. The method as claimed in claim 3 wherein the temperature of the diluted acid solution is 120±2° C.

5. The method as claimed in claim 1 wherein the fiber end is maintained immersed in the heated solution of diluted acid for 43 seconds to 47 seconds.

6. The method as claimed in claim 5 wherein the fiber end is maintained immersed in the heated solution of diluted acid for 45 seconds.

7. The method as claimed in claim 1 wherein the step of neutralizing the diluted acid on the fiber comprises immersing the fiber end in a methanol bath.

8. The method as claimed in claim 7 wherein the fiber end is maintained immersed in the methanol for five seconds.

9. A method for removing the coatings on an optical fiber end having a protective coating and a coating of colored ink overlying the protective coating, said method comprising the steps of:

heating a dilute solution of acid to a temperature of 118° C. to 122° C.;

cleaning the end of the optical fiber;

immersing the optical fiber end in the dilute acid solution for from forty-three to forty-seven seconds;

removing the fiber end from the acid solution and immersing it into an acid neutralizing bath;

removing the fiber end from the neutralizing bath and wiping any remanent ink coating therefrom; and removing the protective coating from the fiber end.

10. The method as claimed in claim 9 wherein the dilute solution of acid comprises sulfuric acid and water.

11. The method as claimed in claim 9 wherein the step of removing the protective coating comprises immersing the fiber end in a sulfuric acid bath.

* * * * *